United States Patent [19]
Mihalik

[11] 3,767,346
[45] Oct. 23, 1973

[54] FILM EXTRUSION DIE
[75] Inventor: John A. Mihalik, Swarthmore, Pa.
[73] Assignee: FMC Corporation, Philadelphia, Pa.
[22] Filed: July 22, 1971
[21] Appl. No.: 165,173

[52] U.S. Cl. .............................. 425/378, 425/461
[51] Int. Cl. .............................................. B29f 3/04
[58] Field of Search ................... 425/378, 379, 461; 239/130, 132, 132.1, 132.3, 135

[56] References Cited
UNITED STATES PATENTS

| | | | |
|---|---|---|---|
| 2,937,402 | 5/1960 | Pierce | 425/378 X |
| 3,497,915 | 3/1970 | Ronden | 425/378 X |
| 3,069,727 | 12/1962 | Shramek | 425/379 X |
| 2,861,900 | 11/1958 | Smith et al. | 239/132.3 X |
| 2,902,716 | 9/1959 | Colombo | 425/378 X |
| 3,129,459 | 4/1964 | Kullgreen et al. | 425/378 X |
| 3,219,786 | 11/1965 | Wenzel | 425/378 X |

Primary Examiner—J. Spencer Overholser
Assistant Examiner—Michael O. Sutton
Attorney—Thomas R. O'Malley et al.

[57] ABSTRACT

An extrusion die including a pair of lips which together serve to shape a molten thermoplastic polymeric material into a film, with a comparatively short heat exchanger movably mounted on one of such lips for use in selectively varying the temperature at localized areas thereof.

7 Claims, 5 Drawing Figures

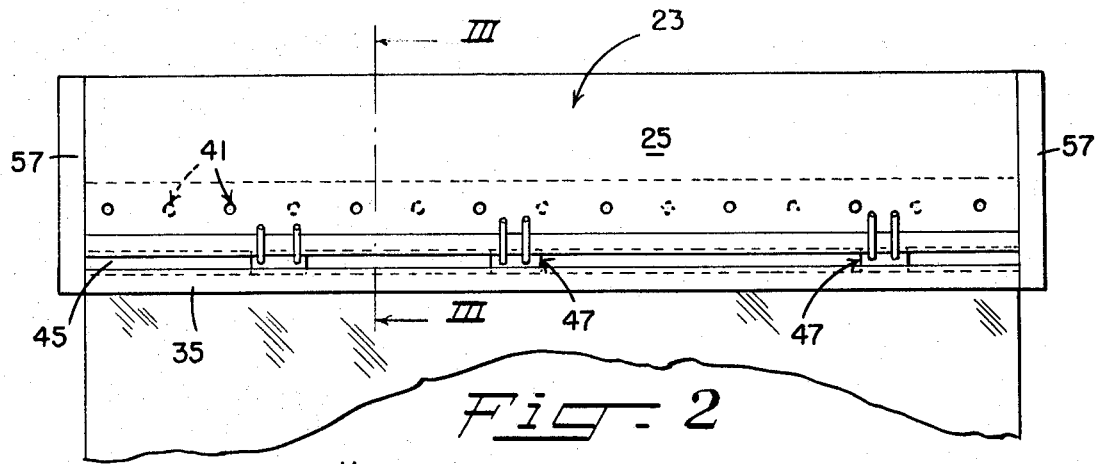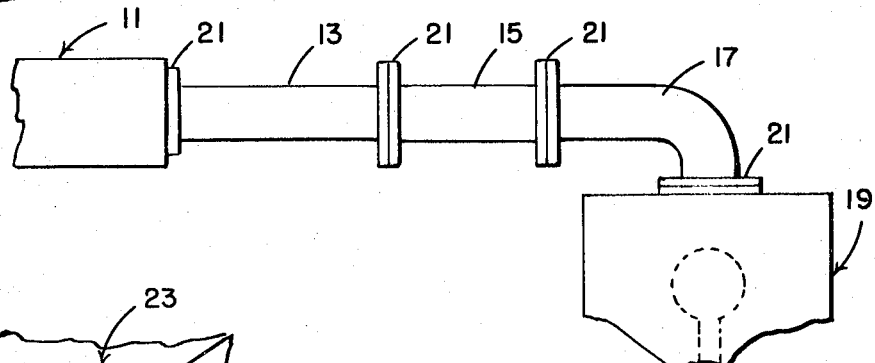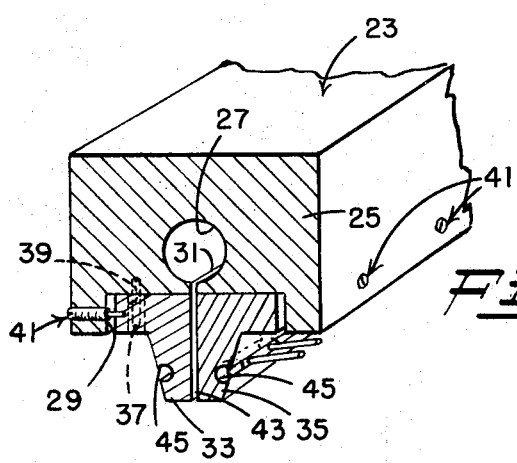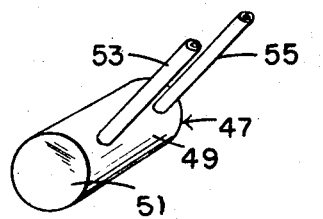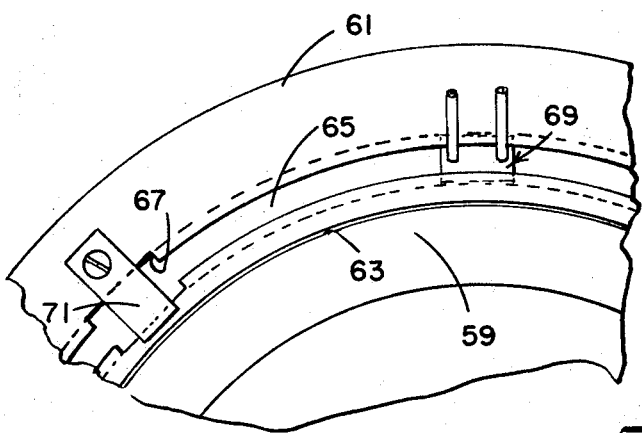

FILM EXTRUSION DIE

This invention relates to an extrusion die for use in making films having improved gauge characteristics.

Typically, in the manufacture of films from thermoplastic polymeric materials by extrusion, a polymeric material is rendered molten with a screw extruder, delivered under pressure to an extrusion die, and forced from between a pair of die lips or blades which together serve to shape the same into a film. As this shaped polymeric material issues from the extrusion die it is generally drawn down and quenched, as on a chilled roller or within a bath of cool water.

Not uncommon in films formed by such conventional extrusion procedure is the presence of longitudinally extending gauge bands; that is, lengthwise thickness variations at intervals across the film width. Such variations may be due, for example, to temperature differences along the die lips, fabrication tolerences, lip warpage which has become set, uneven die lip expansion as the lips are heated during extrusion operations, etc.

An added source of such variations, and one which appears to have heretofore been overlooked, is the introduction of temperature differences into the mass of molten polymeric material during its passage to and/or through the extrusion die. More particularly, while a substantially uniform temperature may exist throughout the mass of molten polymeric material as it leaves the screw extruder, it appears that the temperature of portions of such mass is changed during travel through a flow line between the extruder and die and/or during travel through the die itself, notwithstanding the insulation and/or heaters generally provided along such flow line and die. Thus, while the spacing between lips of an extrusion die may be substantially uniform, portions of the molten polymeric material which are at different temperatures will issue therefrom at different rates and, also, will subject the die lips to uneven heating, with either of these effects being capable of inducing significant variations in the gauge of the film which is being produced.

With conventional elongated extrusion dies, various forms of adjusting mechanisms have been proposed for flexing one or both of the die lips to correct for film gauge variations. However, such die lips are generally massive, so as to possess a necessary rigidity under the extrusion pressures which are encountered, and thus respond to adjustments by flexing along a substantial length rather than at selected, localized areas thereof. Moreover, die-blade flexing is achieved while the die is in a heated condition and usually involves a number of trial-and-error adjustments so that such procedure is slow and tedious. Accordingly, a primary object is to provide a new or generally improved and more satisfactory film extrusion die.

Another object is the provision of an improved extrusion die for use in making film from molten polymeric materials which is adapted to be compensated for temperature differentials in the molten polymeric material which is being extruded to thereby afford better and more accurate control over the gauge of the resulting film.

Still another object is to provide a film extrusion die which includes a pair of die lips, with means for varying the temperature of at least one of such lips at selected localized areas thereof.

A further object is the provision of a film extrusion die which includes a pair of die lips and a relatively short heat-exchanger for varying the temperature of one of the die blades at a localized area thereof.

A still further object is the provision of a film extrusion die having a heat-exchanger which is adjustable along the die lip for use in regulating the temperature at any selected location along the length thereof.

For a greater understanding of this invention, reference is made to the following detailed description and drawing in which FIG. 1 is a diagrammatic side view of a conventional film extrusion system, with portions thereof shown in part;

FIG. 2 is a front view of one embodiment of the extrusion die of the present invention;

FIG. 3 is a transverse vertical section taken along the line III—III of FIG. 2;

FIG. 4 is a perspective view of a heat-exchanger employed in the extrusion die of the present invention; and FIG. 5 is a fragmentary view of a modified embodiment of the extrusion die of the present invention.

The above and other objects of the invention are achieved by a film extrusion die for use with molten thermoplastic polymeric materials which includes a pair of die lips positioned with opposing surfaces thereof in spaced apart relationship to together define an extrusion opening, means for delivering a molten thermoplastic polymeric material under pressure inbetween the die lips for extrusion as a continuous film from the extrusion opening, and a heat exchanger adjustably mounted on one of the die lips for movement along the length thereof into selected positions which are adjacent to but spaced from the extrusion opening. Compared with the die lips, the heat exchanger is relatively short in length, as for example three-eighths inch or less to perhaps three-fourths inch or more, so that it is capable of varying the temperature of the one die lip at only localized areas thereof.

A heat exchanger suitable for use in the die of the present invention may be comprised of a short closed tube with means for circulating a heat exchange medium therethrough. In such heat exchanger, the heat exchange medium may be delivered to and withdrawn directly from the closed tube. Alternatively, a heat exchange medium may be circulated through a coil which is itself positioned within a heat exchange medium held captive within the closed tube. Depending upon the particular effect which is desired upon the die lip, the exchange medium may be heated or cooled prior to its passage through the closed tube. If the heat exchanger is intended to only apply heat to the extrusion die, an electrical resistance unit may be employed.

The heat exchanger may be mounted on the die lip by a variety of means which provide for good heat transfer yet facilitate selective movement of the heat exchanger into different positions along the length of the die lip. For example, such heat exchanger may be clamped or magnetically attached to the die lip or, as hereafter described in detail, by providing a continuous slot along a surface of the die lip remote from the extrusion opening. Such slot is shaped to snugly, yet slidably receive the particular heat-exchanger employed and, desirably, is formed with undercut portions so that the heat exchanger may be retained within such slot.

One or more heat exchangers may be provided along one or both of the extrusion die lips. When a plurality of such heat exchangers are employed, they may be of different lengths and may provide the same or different effects; that is, they may all serve to heat or cool localized areas of the die lip or lips or some may effect cooling while others are heating different localized die lip areas.

The die lips may be formed integrally with the remainder of other portions of the extrusion die or one or both of such die lips may be releasably and adjustably attached to the remainder of the extrusion die to facilitate variation in the spacing therebetween, at least along portions of the extrusion opening.

Thermoplastic polymeric materials which are normally shaped into films by extrusion may be employed with the extrusion die of the present invention. Such film-forming thermoplastic polymeric materials are numerous and include, for example, polypropylene, polyethylene, polyesters, polyvinyl chloride, etc.

With reference to the drawing, FIG. 1 illustrates a typical film extrusion system which includes a screw extruder 11 in which a thermoplastic polymeric material is rendered molten concomitantly with its advancement by the application of pressure thereto. From the extruder 11 the molten thermoplastic polymeric material, which may at this stage be at a substantially uniform temperature, is delivered through conduits 13 and 15 and elbow 17 to a film extrusion die 19. Flanges 21 are provided at the ends of the conduits 13 and 15 and the elbow 17 to facilitate attachment thereof to each other and to the extruder 11 and die 19.

The conduits 13 and 15 and the elbow 17 are generally encased with a thermal insulating material, not shown, and heaters, not shown, may also be placed at certain areas of the conduits 13 and 15 and/or the elbow 17, as well as along the die itself, in an effort to prevent heat loss from the material which is being conveyed therethrough. Notwithstanding these efforts, it appears that differential cooling or heating does occur within the mass of molten thermoplastic material during its transit through the conduits 13 and 15 and elbow 17 and/or the die 19.

Heat losses and gains through the walls and/or flanges of the conduits 13 and 15 and elbow 17 may not be uniform and are aggravated by the fact that all portions of the molten thermoplastic material do not travel paths of equal length between the extruder and die, as during passage through the elbow 17 and also throughout die 19. Thus, the portions of the molten thermoplastic polymeric material which are nearest to the walls of the conduits 13 and 15 and elbow 17 may themselves differ in temperature and may be hotter or cooler than the molten material which flows centrally of such conduits and elbow.

Unfortunately, negligible mixing of the molten thermoplastic material occurs during its transit to the die 19 so that temperature differentials are retained by such material during its flow into and through the die 19. As a result, all portions of the molten thermoplastic material do not flow from the die opening at the same rate. Additionally, the lips of the extrusion die are themselves subjected to different temperatures along the lengths thereof which may induce uneven expansion and variation in the spacing between such lips, resulting in longitudinally extending thickness variations in the film which is produced.

Illustrated in FIGS. 2 and 3 of the drawing is an extrusion die 23 of the present invention which is adapted to be employed in an extrusion system as shown in FIG. 1. The die 23 includes a die body 25 having along the length thereof a central cavity 27, into which a molten thermoplastic material is delivered under pressure, an exposed recess 29, and a slot 31 extending between such cavity and recess.

Die lips or blades 33 and 35 are disposed within the recess 29 and are each fixed to the die body 25 by a separate series of socket head cap screws 37. Openings 39 are provided in the die lips 33 and 35 for passage of the cap screws 37, with such openings 39 being slightly larger in diameter than the shanks of the cap screws to permit adjustment of the die lips relative to the die body. As in known extrusion dies, conventional differential adjusting screw assemblies 41 are threaded into the die body 25 and the respective die lips 33 and 35 for moving such lips to provide an extrusion opening 43 of desired width.

Extending along an outside surface of at least one of the die lips 33 and 35 is a groove 45 which is preferably undercut for retaining therein one or more heat-exchangers 47. As illustrated the groove 45 is located adjacent to but spaced from and substantially parallel to the extrusion opening 43 and extends along the length of the die lip.

The particular heat-exchanger 47 shown in FIG. 4 merely consists of a tubular body 49 which is closed at its ends 51 and into which open supply and exhaust conduit 53 and 55. A heat-exchanger medium, as for example oil, is delivered from a suitable source, not shown, passed through the heat exchanger 47 to effect a desired heating or cooling along the area of the die lip adjacent thereto, and then discharged as waste or returned to its source where it is again heated or cooled and recirculated. Desirably, the heat-exchanger 47 makes snug contact with the die lip, when the latter is in its heated condition, to provide for good thermal conduction therebetween and to permit the heat-exchanger 47 to be retained in its adjusted position merely by the friction between these members.

As heretofore mentioned, the heat-exchanger 47 is relatively short in length, as compared to the length of die lips 33 and 35, since it is desired that the influence exerted by such exchanger be confined only to a very small selected area of a die lip. While the width of the film influenced by the heat-exchanger is primarily dependent upon the length of the heat-exchanger itself, some small variation in such width can be achieved by varying the temperature of the heat exchange medium circulated through such heat-exchanger.

As shown in FIG. 1, the extrusion die 23 also includes end plates 57 which close off the ends of the central cavity 27, the extrusion opening 43, and the groove 45. Unless the opening into the groove 45 at the surface of the die lip is sufficiently large to permit insertion of the heat-exchanger 47 therethrough, the exchanger is positioned within such groove 45 from one of its ends prior to the application of the end plate 57 thereat. As illustrated in FIGS. 2 and 3, like grooves 45 may be provided along both of the die lips 33 and 35 and may each contain a single or a plurality of separate heat-exchangers.

The teachings of the present invention are also applicable for use in the manufacture of tubular film. Thus, shown in FIG. 5 are annular die lips 59 and 61 which together define an extrusion opening 63 of desired width. A continuous groove 65 is formed in the lip 61 and as illustrated, is substantially parallel to the extrusion opening 63. This groove 65 is undercut, except at the location indicated at 67, to permit insertion therein of a heat exchanger 69. A plate 71 is applied over the location 67 after the heat-exchanger 69 is inserted within the groove 65. Operation and function of the heat exchanger 69 is substantially the same as the exchanger 47 heretofore described.

It is to be understood that changes and variations may be made without departing from the spirit and scope of the invention as defined in the appended claims.

I claim:

1. A film extrusion die which includes a pair of die lips positioned with opposing surfaces thereof in spaced apart relationship to together define an extrusion opening, means for delivering a molten thermoplastic polymeric material under pressure inbetween said die lips for extrusion as a film from said extrusion opening, and a heat exchanger slidably mounted on one of said die lips for selective adjustment relative to said one die lip along a path which is substantially parallel to but spaced from said extrusion opening, said heat exchanger being of such size as to contact with only a fractional portion of such one die lip in each of the positions to which it is adjusted to thereby facilitate variation in the temperature of said one die lip at only localized areas thereof.

2. A film extrusion die as defined in claim 1 wherein a plurality of separate heat exchangers are slidably mounted on said one die lip for independent sliding adjustment into different positions relative to said extrusion opening.

3. A film extrusion die as defined in claim 1 wherein at least one heat exchanger is slidably mounted on the other of said die lips for selective adjustment along a path which is substantially parallel to but spaced from said extrusion opening.

4. A film extrusion die as defined in claim 1 wherein said heat exchanger includes a closed tube and means for circulating a heat exchange medium through such tube.

5. A film extrusion die as defined in claim 4 wherein said one die lip includes a continuous slot formed in a surface thereof remote from said opposing surfaces, said slot shaped to slidably receive said heat exchanger and having undercut portions to retain said heat exchanger therein.

6. A film extrusion die as defined in claim 5 wherein said die lips are annular for use in forming tubular films.

7. A film extrusion die as defined in claim 5 wherein said die lips are elongated for use in forming flat films.

* * * * *